United States Patent [19]

Dasgupta

[11] Patent Number: 4,500,430
[45] Date of Patent: Feb. 19, 1985

[54] CONTINUOUSLY REJUVENATED ION EXCHANGER

[76] Inventor: Purnendu K. Dasgupta, 4345 28th St., Lubbock, Tex. 79410

[21] Appl. No.: 421,082

[22] Filed: Sep. 22, 1982

[51] Int. Cl.³ .............................................. B01J 47/12
[52] U.S. Cl. ...................................... 210/638; 29/456; 29/505; 210/656; 210/678; 210/679; 210/321.1; 210/497.1; 264/295; 264/320
[58] Field of Search ............... 210/638, 656, 670, 678, 210/679, 681, 683, 685, 321.1, 483, 487, 497.1, 500.2, 502; 521/27, 29; 29/456, 505; 264/295, 320

[56] References Cited

U.S. PATENT DOCUMENTS 3,463,615 8/1969 Sochor ..................................... 55/36
4,045,352 8/1977 Rembaum et al. ..................... 521/29

OTHER PUBLICATIONS

Stevens, T. S. et al., "Hollow Fiber Ion-Exchange Suppressor for Ion-Chromatography", *Anal. Chem.* 53, 1488-1492 (Aug. 1981).
Stevens, T. S. et al., "Packed Hollow Fiber Suppressors for Ion-Chromatography", *Anal. Chem.* 54, 1206-1208 (Jun. 1982).

*Primary Examiner*—Ivars Cintins
*Attorney, Agent, or Firm*—Limbach, Limbach & Sutton

[57] ABSTRACT

An apparatus for ion exchange which comprises (1) a very small diameter helix shaped inner tube of a suitable ion exchanging material having a filament therein and having its terminal ends inserted into entry and exit tubes, and (2) a diametrically slightly larger and longer length hollow outer tube having (a) the helix enclosed therein; (b) inlet and outlet apertures; and (c) sealed ends around the entry and exit tubes leading to the helix, and the method of making and using the same.

51 Claims, 5 Drawing Figures

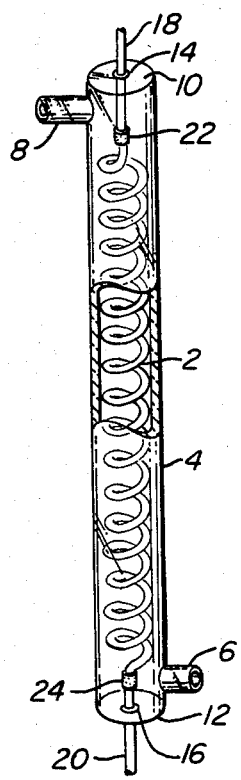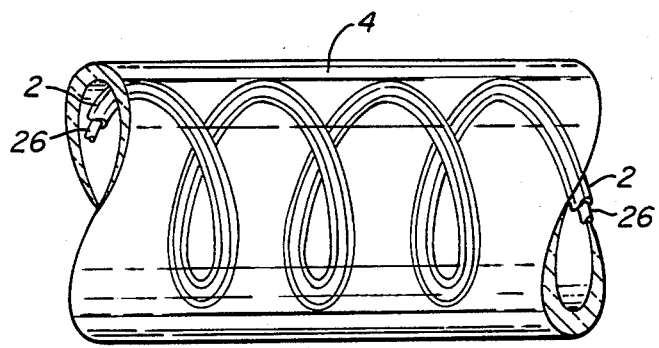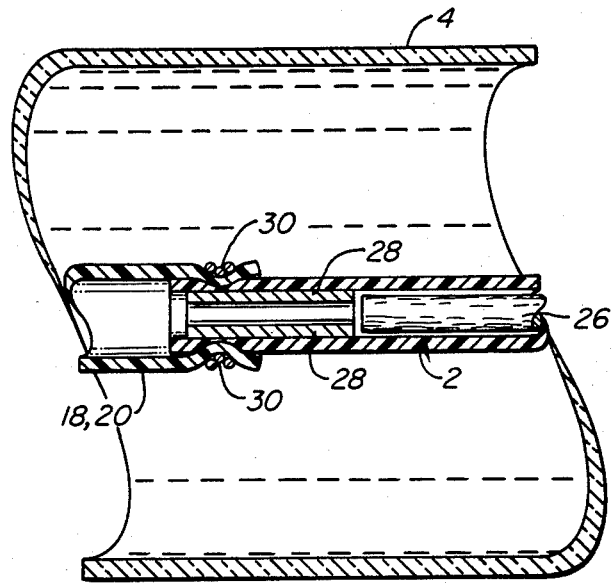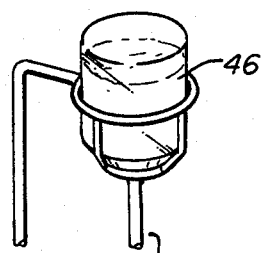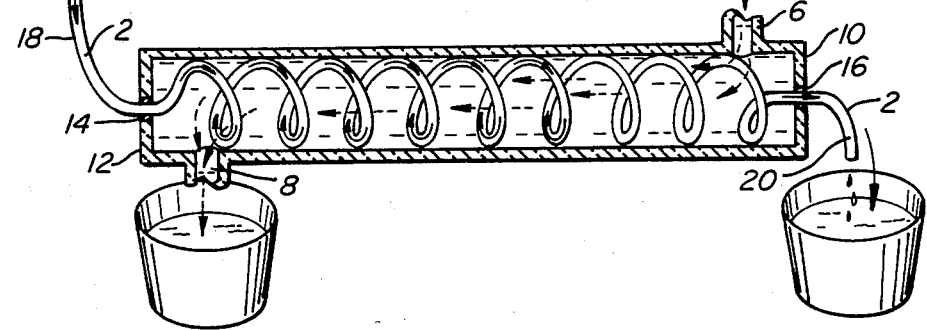

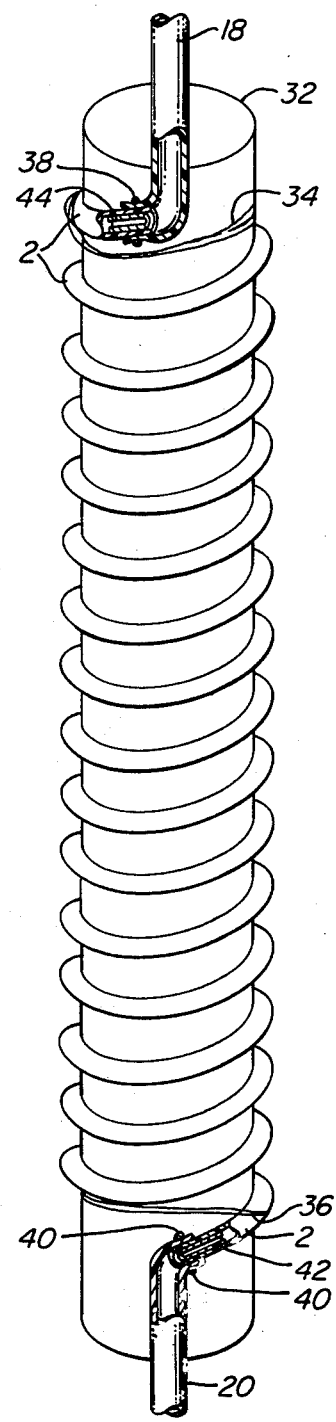
FIG._4.

CONTINUOUSLY REJUVENATED ION EXCHANGER

DESCRIPTION

1. Technical Field

This invention relates to an improved continuously rejuvenated exchanger.

2. Background Art

The art of ion exchange chromatography is well developed. Although there are natural ion exchangers, such as clay and zeolites, the majority of ion exchangers used today are synthetic resins. The resins are generally high molecular weight, polymeric materials containing a large number of ionic functional groups per molecule.

Cation (positive ions) exchange resins are usually strong acid resins having sulfonic acid groups or weak acid resins containing carboxylic acid groups. Anion (negative ions) exchange resins contain strong base groups, such as quaternary amines, or weak bases, such as secondary and tertiary amines.

Chromatography in general refers to an analytic separation process based upon differences in migration rates of various components of a mixture traveling through a stationary medium. In ion exchange chromatography a small volume of a solution mixture containing test ions of interest is injected on a column packed with an ion exchange resin for exchanging the test ions with ions of like charge.

The column is flushed continuously with an electrolyte solution, called the eluting solution, to provide the motive force for the ions in the injected sample to move along the column.

Separation between the test ions of interest occurs because some ions, such as polyvalent ions, are more strongly held and thus elute more slowly than weakly held ions. The less strongly held ions move down the column more quickly and can be collected before the strongly held ions appear in the effluent.

In order to ascertain the appearance of the test ions in the effluent, a second column is commonly used in a major type of ion exchange chromatography.

For example, to separate and quantify the amount of chloride and sulfate in a sample, an aliquot is injected on a column containing an anion exchange resin which is being flushed with an eluting solution containing a weak acid salt such as sodium carbonate. Because of equilibration with the eluting solution the anion exchange resin is in the carbonate form, i.e., it contains carbonate as the exchangeable anion. As the chloride and sulfate attaches to the anion exchange sites at the top of the column, an equivalent amount of carbonate is set free. Due to continuous exchange with carbonate in the eluting solution, the chloride and sulfate travel along the column, albeit at different rates. Having a much higher affinity for the anion exchange sites, the divalent sulfate ion migrates much slower than the monovalent chloride ion and appears in the effluent correspondingly later.

As they exit from this column, the chloride and sulfate ions are present as sodium chloride and sodium sulfate along with sodium carbonate present in the eluting solution. The effluent from the first column is then put through a second column containing a cation exchange resin in the hydrogen ion form. The sodium ions in the solution are taken up completely by the ion exchange resin for an equivalent amount of hydrogen ions. The sodium chloride and sulfate are thus converted to hydrochloric and sulfuric acids, respectively, easily detectable with an electrical conductivity detector over a background of the weakly conducting carbonic acid, resulting from the sodium carbonate in the eluting solution.

In such a two-column system, the second column, initially in the hydrogen form, is soon converted completely to the sodium form and needs regeneration or replacement.

A continuously regenerated ion exchanger is made possible by utilizing a hollow tube made of a polymeric ion exchanger, surrounded by an outer jacket through which an appropriate regenerant solution is made to flow. In the example given above, the effluent from the first column can be made to flow through a hollow tube made of a cation exchanger surrounded by an outer jacket through which a dilute mineral acid solution, containing a plentiful supply of hydrogen ions, is flowing. The sodium ions in the first column effluent diffuse to the walls of the hollow tube, are exchanged for hydrogen ions and eventually diffuse to the outer part of the wall where they are replaced by the hydrogen ions from the contacting acid solution. Thus, the ion exchange sites are continuously rejuvenated.

However, as the first column effluent flows through the hollow tube, mixing occurs and the volume containing a separated ion increases; this is called band broadening. Band broadening is particularly undesirable since it effectively decreases the resolution (separation) between the ions achieved upon passage through the first column.

Band broadening increases with the fourth power of tube diameter and directly with the length of the tube while the degree of ion exchange achieved is related directly to the length of the tube and inversely to the volumetric flow rate through the tube. At typical chromatographic flow rates (0.5–5 mL/min) the length of the tube necessary to provide complete ion exchange is considerable and results in unacceptably large band broadening even with the narrowest diameter tubes available.

It has now been discovered that a continuously regenerated ion exchanger can be made which displays very small or negligible band broadening and which also provides a much greater degree of ion exchange per unit length of the tube compared to devices heretofore available, when the ion exchanger is constructed according to this invention.

It is, therefore, an object of the invention to provide a continuously rejuvenated ion exchanger which exhibits low band broadening.

It is another, and perhaps more important, object of this invention to increase the rate of ion exchange.

In furtherance of these objectives the improved continuously rejuvenated ion exchanger of this invention has been developed.

DISCLOSURE OF THE INVENTION

This invention is an improved continuously rejuvenated ion exchanger and the method of making and using such an ion exchanger.

The apparatus for ion exchange comprises: (1) a hollow or filament filled, very small diameter helix shaped inner tube of a suitable ion exchanging material having its terminal ends inserted into entry and exit tubes; and (2) a diametrically slightly larger and longer length hollow outer tube having (a) the helix enclosed therein, (b) inlet and outlet apertures, and (c) sealed ends around the entry and exit tubes connected to the helix.

The apparatus of this invention is made by a method comprising the steps of: winding the ion exchanging polymer tubing around a support rod to form a helix; tying the ends of the tubing to the support rod; exposing the supported tubing to sufficient heat and then cooling so that it becomes hardened in the helical shape; removing the support rod and the ties; connecting the terminal ends of the helix to entry and exit tubes; providing a diametrically slightly larger outer tube having inlet and outlet apertures for regenerating solution; inserting the helix into the outer tube so that the entry and exit tubes extend beyond the outer tube ends; and sealing the ends of the outer tube around the tubes leading to the helix.

If the ion exchange tubing is insufficiently rigid to hold a helical conformation by itself the support rod and ties are left in place.

For a filament filled helix, a filament or wire is first inserted throughout the length of the ion exchange tubing prior to winding into a helix.

The apparatus of this invention may be used in a method of ion exchange comprising the following steps: providing a helix shaped inner tube of a suitable ion exchanging polymer with entry and exit tubes; enclosing the helix in a diametrically slightly larger and longer length hollow outer tube having inlet and outlet apertures; sealing the ends of the outer tube around the entry and exit tubes leading to the helix; connecting the entry tube to the helix to a feed tube from the vessel containing the solution to undergo ion exchange; releasing the solution to the helix; simultaneously directing the flow of an appropriate regenerant solution into the outer tube; and separately collecting the ion exchanged solution.

DESCRIPTION OF THE DRAWINGS

FIG. 1 is a perspective view of the ion exchanger of this invention showing a section of a helix shaped inner tube.

FIG. 2 is a sectional view of the ion exchanger of this invention showing the helix shaped inner tube containing a filament therein.

FIG. 3 is a sectional end view of the ion exchanger of this invention showing the terminal end of the helix joined in a leak-proof seal to a lead tube.

FIG. 4 is a perspective view of a supported helix.

FIG. 5 is a flow diagram depicting the operation of the continuously regenerated ion exchanger of this invention.

Referring now more specifically to FIGS. 1 and 2, the helix shaped inner tube 2 of this invention is enclosed in a diametrically slighly larger and longer length hollow outer tube 4.

Outer tube 4 contains an inlet aperture 6 and an outlet aperture 8 for intake and out-flow of a regenerant solution. The ends 10, 12 of outer tube 4 contain seals 14, 16 around the entry tube 18 and exit tube 20 leading to the helix 2.

FIG. 2 shows helix 2 having contained therein a filament 26.

Leak-proof connections 22, 24 between the entry and exit or lead tubes 18, 20 and terminal ends of helix 2 are shown in more detail in FIG. 3. Helix 2 may or may not be filled with filament 26. A short section of microbore tubing 28 is inserted into either terminal end of helix 2 which is inserted into lead tubes 18, 20. A clamp or wire 30 is tied around tubes 18, 20 to form a leak-free connection.

FIG. 4 shows the details of helix 2 when the support rod 32 must be left in place. The helix 2 is tied to the support rod 32 by nylon thread 34, 36 at the terminal ends where a section of microbore tubing 42, 44 is inserted. Connection to lead tubes 18, 20 are made and a leak-free connection assured by clamps or wire crimps 38, 40 as before.

Referring now to FIG. 5, it can be seen how the ion exchanger of the invention operates. The solution 46 to undergo ion exchange passes through tube 18 into the helix 2. Solution 46 flows along helix 2 and where helix 2 contains filament 26, it flows along the annular space between filament 26 and the walls of helix 2.

Simultaneously, a dilute regenerant solution 48 containing a plentiful supply of the regenerant ion is put into the outer tube 4 at inlet 6. The regenerant solution 48, flowing through outer tube 4 in the opposite direction of the flow of solution 46 through helix 2, exits at outlet 8. Ions are exchanged between solution 46 and those of the helix 2 which is constructed of a suitable ion exchanging material. Ion exchange also occurs between the walls of helix 2 and the regenerant solution 48, thus replenishing the ions lost in helix 2 to solution 46.

BEST MODE FOR CARRYING OUT THE INVENTION

The starting material for the ion exchanger of this invention is a thin walled, narrow diameter polymer tubing having a sufficient number of ionic functional groups to be an effective ion exchanger. For example, DuPont's Nafion 811x, a cation exchange membrane comprised of a fluorocarbon backbone with pendant sulfonic acid groups as ion exchange sites, has been used as a cation exchanger.

a. A hollow helix

A section, generally 50 to 200 centimeters (cm) in length, of the ion exchanger tubing is taken. A small piece, approximately one cm in length, of inert microbore tubing is inserted into each terminal end of the ion exchanger tubing. One end is then tied to a support rod 1/16 inch in diameter with common nylon sewing thread. The tie is made precisely where the microbore tubing has been inserted. The tubing is then wound tightly around the support rod and the other free end is tied to the rod.

It is important to keep the diameter of the helix as small as possible with each turn as close as possible to the next one. Preferably the diameter is less than 10 millimeters, and ideally it should be less than 5 millimeters. Since some ion exchanger tubing such as Nafion 811x expands significantly when wet, such tubing should be wetted thoroughly before winding into a helix.

The rod supporting the helix is then subjected to sufficient heat to permanently shape the tubing into the helix. This can be accomplished by dipping the rod into boiling water for approximately fifteen minutes. The actual time and temperature required will obviously depend upon the composition of the tubing. In some cases, the thermal treatment is unnecessary. The winding itself is sufficient. In still other cases, despite the thermal treatment, the tubing may not be rigid enough to retain its helical configuration, especially when a significant pressure drop exists across the tubing.

After the heat treatment the tubing is allowed to cool. The end ties and support rod are removed unless the tubing is insufficiently rigid, in which case they are left in place.

The helix is connected to lead tubes by leak-free connections. Each terminal end of the helix is inserted into a close fitting polyetrafluoroethylene tubing to which connection is to be made. A thin wire is wound tightly around the outer tubing and crimped to provide a leak-free connection. The microbore tubing inside the ion exchange tubing ensures an open fluid passage.

The helix with the lead tubes inserted into a tube made of any convenient material, glass being the most common. The ends, where the lead tubes to the helix protrude, are sealed with any suitable inert sealant, such as silicone rubber glue.

b. A filament filled helix

For a filament filled helix, after a short section of microbore tubing has been inserted into one end of the ion exchange tubing, a close fitting polymeric filament, e.g. monofilament nylon fishing line or a metallic wire, e.g. nichrome or stainless steel, is inserted throughout the length of the tubing save about a centimeter at the other end where again a short section of microbore tubing is inserted. If the ion exchanger tubing swells significantly when wet, the tubing is wetted thoroughly prior to filament insertion.

The subsequent steps for constructing a filament-filled helical ion exchanger are the same as those outlined for a hollow helix. In a filament-filled helix the filament retains the helical configuration, irrespective of the structural rigidity of the ion exchanger tubing; (after thermal treatment, if necessary), the support rod is always removed.

c. Operation

During operation of the ion exchanger, the ions in the solution flowing through the helix migrate to the walls of the tubing. Ions are exchanged between both those in the helical tube and those in the regenerant solution flowing outside the walls of the helical tubing. The latter occurs when the ions eventually permeate the walls of the helical tubing. As long as the regenerant solution is kept reasonably dilute, direct penetration through the membrane wall does not occur.

For example, during cation exchange the sample solution is made to flow through a helical exchanger made from tubing such as Nafion 811x, while a dilute mineral acid solution, containing a plentiful supply of hydrogen ions flows through the outer tubing. Cations in the sample solution migrate to the helix wall and are exchanged for hydrogen ions present in the ion exchanger tubing. When they permeate the wall of the helix, they are exchanged for hydrogen ions present in the acid regenerant solution. Thus, the ion exchange sites in the ion exchange tubing are continuously regenerated. Ideally, the flow path of the regenerant solution is counter-current to the flow path of solution in the ion exchange column.

If an adequate regenerant flow is maintained in the outer jacket, the degree of ion exchange is dependent upon the flow rate through the inner tubing, the nature and thickness of the ion exchange tubing. The pressure drop through the outer tube is mimimal and gravity flow is sufficient to maintain a satisfactory regenerant flow rate.

d. Performance

There are several advantages to the small diameter helical ion exchanger. In a non-helical ion exchanger the rate of ion exchange is limited by the rate of migration of the sample ions to the tubing wall. In a linear tube, the only motive force is diffusion. Contrastingly, in a helical tube, the helical flow generates a centrifugal force transporting the sample ions to the wall. The combination of perpendicular and axial flow creates a bolus flow, providing an additional mechanism to aid transport of the ions to the wall. The narrower the diameter of helix and the closer the spacing between the turns, the greater is the bolus flow.

At normal chromatographic flow rates, bolus transport dominates diffusion transport for the helical ion exchangers described above. The result is a greater degree of ion exchange than in a linear tube of the same length. The degree of ion exchange achieved when a 1 millimolar solution of $KNO_3$ (potassium nitrate) was made to flow through the device at flow rates 0.5–5.0 ml/minute is shown below; in all cases a 50 cm length of Nafion 811x was used as the ion exchanger tubing:

| | Percent Potassium Ions Exchanged | | | |
|---|---|---|---|---|
| Flow Rate (ml/min) | Empty tube, linear configuration | Empty tube, helically wound on 1/16 in. dia. rod | Filament (30 lb. test nylon) filled, linear configuration | Filament (30 lb. test nylon) filled, helix |
| 5.0 | 26 | 33 | 54 | 70 |
| 2.0 | 44 | 57 | 76 | 90 |
| 1.0 | 62 | 77 | 87 | 95 |
| 0.5 | 80 | 86 | 91 | 97 |
| Regenerant: 5 millimolar sulfuric acid, 5 ml/min. | | | | |

Clearly, the performance of the filament filled helix is superior to the others. The performance of the hollow helix is not as good as the filament filled helix because this particular example concerns a supported helix. As such, the surface of the tubing in contact with the support is not available for mass transfer, thereby resulting in relatively poor performance, although it is still better than an empty linear tube even though the latter has a substantially larger available surface for mass transfer.

The other important performance parameter is band broadening. Since band broadening increases with increasing tube length, a helical configuration ensures minimal band broadening for any desired degree of ion exchange, by minimizing the required tube length. Helical flow further minimizes axial dispersion, also helping to limit band broadening.

Listed below are the extents of band broadening when a 75 $\mu$l (microliter) sample was made to pass through a continuously regenerated ion exchanger made with a 150 cm long Nafion 811x tube in various configurations.

| Increase in Volume Containing the Sample[1] (Band Broadening) | | | |
|---|---|---|---|
| Empty tube linear | Empty tube helically wound on 1/16 in. dia. rod | Filament (30 lb test nylon) filled, linear | Filament (30 lb test nylon) helical |
| 650 $\mu$l | 25 $\mu$l | 125 $\mu$l | 25 $\mu$l |
| Flow rate: 2 ml/min. | | | |

[1]The values are somewhat dependent on the pressure drop experienced by the ion exchanger device, all of them were, however, operated with the same back pressure.

The helically designed ion exchanger is clearly superior. While the filament is not essential to the helical ion exchanger, it has several advantages. It reduces the dead volume in the tubing to a minimum, helping to reduce band broadening. Flow occurs only in the annular space between the inner wall of the ion exchanger and the filament.

In order that the rate of ion exchange does not become limited by the transport of the ion through the wall, the ion exchanger tubing used must necessarily have a relatively thin wall. Frequently, thin walled ion exchange tubing such as Nafion 811x has little structural rigidity and an unsupported hollow helix cannot be utilized, in as much as the shape is not retained during use, especially when a pressure drop exists across the tube. However, with more rigid tubing, e.g. polystyrene, hollow helices are possible and very narrow diameter tubes produce results as satisfactory as filament filled helices.

I claim:

1. An apparatus for ion exchange which comprises:
   (a) an inner tube of an ion exchanging material having:
      (1) a length of approximately 50 to 200 centimeters;
      (2) a helical configuration with a diameter of less than 10 millimeters; and
      (3) its terminal ends inserted into entry and exit tubes; and
   (b) a filament within the helix; and
   (c) a hollow outer tube having:
      (1) a larger diameter and longer length than the helix;
      (2) the helix enclosed therein;
      (3) inlet and outlet apertures; and
      (4) sealed ends around the entry and exit tubes leading to the helix.

2. An apparatus according to claim 1 in which the helix is a polymer tube.

3. An apparatus of claim 2 in which the polymer tube is strongly acidic.

4. An apparatus of claim 3 in which the polymer tube contains sulfonic acid functional groups.

5. An apparatus of claim 3 in which the polymer tube is a cation exchange membrane comprising a fluorocarbon backbone with pendant sulfonic acid groups as ion exchange sites.

6. An apparatus of claim 2 in which the polymer tube is weakly acidic.

7. An apparatus of claim 6 in which the polymer tube contains carboxylic acid functional groups.

8. An apparatus according to claim 2 in which the polymer tube contains strongly basic functional groups.

9. An apparatus according to claim 8 in which the polymer tube contains ammonium functional groups.

10. An apparatus according to claim 2 in which the polymer tube contains weakly basic functional groups.

11. An apparatus according to claim 10 in which the polymer tube is selected from the group consisting of secondary and tertiary amines.

12. An apparatus according to claim 1 in which the helix is less than 5 millimeters in diameter.

13. An apparatus of claim 1 in which the filament is a wire.

14. An apparatus of claim 1 in which the filament is an inert polymer.

15. An apparatus of claim 14 in which the filament is nylon.

16. An apparatus for ion exchange which comprises:
   (a) an inner tube of a cation exchange membrane comprising a fluorocarbon backbone with pendant sulfonic acid groups as ion exchange sites having:
      (1) a length of approximately 50 centimeters;
      (2) a helical configuration with a diameter of less than 5 millimeters; and
      (3) its terminal ends inserted into entry and exit tubes; and
   (b) a nylon filament within the helix; and
   (c) a hollow outer tube having:
      (1) a larger diameter and longer length than the helix;
      (2) the helix enclosed therein;
      (3) inlet and outlet apertures; and
      (4) sealed ends around the entry and exit tubes leading to the helix.

17. A method for making an ion exchange apparatus comprising the steps of:
   (a) inserting a filament into an inner tube of an ion exchanging polymer tubing;
   (b) winding the filament containing tubing around a support rod to form a helix;
   (c) tying the ends of the tubing to the support rod;
   (d) exposing the supported tubing to sufficient heat so that it becomes hardened in the helical shape;
   (e) removing the support rod and the ties;
   (f) inserting the terminal ends of the helix into entry and exit tubes;
   (g) providing an outer tube, having a larger diameter than the helix and having inlet and outlet apertures for regenerating solution;
   (h) inserting the helix into the outer tube so that the entry and exit tubes leading to the helix extend beyond the outer tube; and
   (i) sealing the ends of the outer tube around the entry and exit tubes leading to the helix.

18. Method according to claim 17 in which the supported tubing is dipped into boiling water until the helical shape is set.

19. A method according to claim 17 in which the filament is a wire.

20. A method according to claim 17 in which the filament is an inert polymer.

21. A method according to claim 20 in which the filament is nylon.

22. A method according to claim 17 in which the polymer inner tube is strongly acidic.

23. A method according to claim 22 in which the polymer inner tube contains sulfonic acid functional groups.

24. A method according to claim 22 in which the inner tube is a cation exchange membrane comprising a fluorocarbon backbone with pendant sulfonic acid groups as ion exchange sites.

25. A method according to claim 17 in which the polymer inner tube is weakly acidic.

26. A method according to claim 25 in which the polymer inner tube contains carboxylic acid functional groups.

27. A method according to claim 17 in which the polymer inner tube contains strongly basic functional groups.

28. A method according to claim 27 in which the polymer inner tube contains ammonium functional groups.

29. A method according to claim 17 in which the polymer inner tube contains weakly basic functional groups.

30. A method according to claim 29 in which the polymer inner tube is selected from the groups consisting of secondary and tertiary amines.

31. A method according to claim 17 in which the polymer tubing has a length in the range of approximately 50–200 centimeters.

32. A method according to claim 17 in which the helix is less than 5 millimeters in diameter.

33. A method of ion exchange chromatography comprising the steps of:
(a) providing a helix shaped inner tube of an ion exchange polymer having a diameter of less than 10 millimeters and its terminal ends inserted into entry and exit tubes;
(b) inserting a filament into the helix shaped inner tube;
(c) enclosing the helix in a hollow outer tube having a larger diameter and longer length than the helix and inlet and outlet apertures;
(d) sealing the ends of the outer tube around the entry and exit tubes leading to the helix;
(e) connecting the helix entry tube to the vessel containing the solution to undergo ion exchange;
(f) releasing the solution to the helical tube;
(g) simultaneously directing the flow of an appropriate regenerant solution into the outer tube; and
(h) separately collecting the ion exchanged solution at the other end of the helix.

34. A method according to claim 33 in which the flow rate of the solution to undergo ion exchange ranges from 0.5 to 5.0 milliliters per minute.

35. A method according to claim 33 in which the flow of the regenerant solution is directed counter current to the solution in the inner tube.

36. A method according to claim 33 in which the filament is wire.

37. A method according to claim 33 in which the filament is an inert polymer.

38. A method according to claim 37 in which the filament is nylon.

39. A method according to claim 33 in which the polymer inner tube is strongly acidic.

40. A method according to claim 39 in which the polymer inner tube contains sulfonic acid functional groups.

41. A method according to claim 39 in which the polymer inner tube is a cation exchange membrane comprising a fluorocarbon backbone with pendant sulfonic acid groups as ion exchange sites.

42. A method according to claim 33 in which the polymer inner tube is weakly acidic.

43. A method according to claim 42 in which the polymer inner tube contains carboxylic acid functional groups.

44. A method according to claim 33 in which the polymer inner tube contains strongly basic functional groups.

45. A method according to claim 44 in which the polymer inner tube contains ammonium functional groups.

46. A method according to claim 33 in which the polymer inner tube contains weakly basic functional groups.

47. A method according to claim 46 in which the polymer inner tube is selected from the group consisting of secondary and tertiary amines.

48. A method according to claim 33 in which the polymer tube has a length in the range of 50–200 centimeters.

49. A method according to claim 33 in which the inner tube is less than 5 millimeters in diameter.

50. A method of ion exchange chromatography comprising the steps of:
(a) providing an ion exchanging inner tube of a cation exchange membrane comprising a fluorocarbon backbone with pendant sulfonic acid groups as ion exchange sites having:
(1) a length of approximately 50 centimeters;
(2) a helical configuration with a diameter of less than 5 millimeters; and
(3) its terminal ends inserted into entry and exit tubes;
(4) a nylon filament contained therein; and
(b) enclosing the helix in a hollow outer tube having a larger diameter and longer length than the helix and having inlet and outlet apertures;
(c) sealing the ends of the outer tube around the entry and exit tubes leading to the helix;
(d) connecting the entry tube to the vessel containing the solution to undergo ion exchange;
(e) releasing the solution to the helical tube so that a flow rate between 0.5 and 5.0 milliliters per minute is established;
(f) simultaneously directing the flow of an appropriate regenerant solution in the outer tube counter current to the flow of solution in the helix; and
(g) and collecting the ion exchanged solution from the exit tube from the helix.

51. An apparatus for ion exchange which comprises:
(a) a substantially linear inner tube of an ion exchanging material having its terminal ends inserted into entry and exit tubes;
(b) a filament within the inner tube; and
(c) a hollow outer tube having:
(1) a larger diameter and longer length than the inner tube;
(2) the inner tube enclosed therein;
(3) inlet and outlet apertures; and
(4) sealed ends around the entry and exit tubes leading to the inner tube.

* * * * *